(12) United States Patent
Chengyou et al.

(10) Patent No.: US 8,263,703 B2
(45) Date of Patent: Sep. 11, 2012

(54) ONE-COMPONENT SELF-CROSSLINKING REACTIVE SILOXANE-TERMINATED POLYPROPYLENE OXIDE EMULSION AND PROCESS FOR PREPARING THE SAME

(75) Inventors: Kan Chengyou, Beijing (CN); Hou Zhao Sheng, Beijing (CN); Li Zeping, Beijing (CN); Xie Wei, Beijing (CN); Zhao Zhiqing, Beijing (CN); Yon Zhang, Shanghai (CN); Thomas Fay-Oy Lim, Killingworth, CT (US)

(73) Assignee: Henkel AG & Co. KGaA, Duesseldorf (DE)

( * ) Notice: Subject to any disclaimer, the term of this patent is extended or adjusted under 35 U.S.C. 154(b) by 99 days.

(21) Appl. No.: 12/824,861

(22) Filed: Jun. 28, 2010

(65) Prior Publication Data
US 2010/0331476 A1    Dec. 30, 2010

Related U.S. Application Data

(63) Continuation of application No. PCT/EP2008/066317, filed on Nov. 27, 2008.

(30) Foreign Application Priority Data

Dec. 26, 2007 (CN) .......................... 2007 1 0300286

(51) Int. Cl.
C08L 75/06 (2006.01)
C08G 77/06 (2006.01)
B01F 3/08 (2006.01)

(52) U.S. Cl. ........ 524/588; 524/591; 523/322; 523/336; 523/346; 528/28; 528/38

(58) Field of Classification Search ............ 528/28, 528/38; 523/322, 336, 346; 524/588, 591
See application file for complete search history.

(56) References Cited

U.S. PATENT DOCUMENTS

| | | | |
|---|---|---|---|
| 3,971,751 A | 7/1976 | Isayama et al. | |
| 4,374,237 A | 2/1983 | Berger et al. | |
| 5,300,608 A | 4/1994 | Chu et al. | |
| 5,986,014 A | 11/1999 | Kusakabe et al. | |
| 6,420,492 B1 | 7/2002 | Kusakabe et al. | |
| 6,803,412 B2 | 10/2004 | Nguyen-Misra et al. | |
| 7,691,940 B2 * | 4/2010 | Isobe et al. | 524/589 |
| 2006/0183845 A1 * | 8/2006 | Harada et al. | 524/588 |

FOREIGN PATENT DOCUMENTS

| | | |
|---|---|---|
| GB | 926888 | 5/1963 |
| WO | WO 03/006534 | 1/2003 |
| WO | WO 03/018658 | 3/2003 |
| WO | WO 2007/090867 | 8/2007 |

OTHER PUBLICATIONS

International Search Report issued for International Patent Application No. PCT/EP2008/066317 mailed on Jul. 3, 2009.

* cited by examiner

*Primary Examiner* — Tae H Yoon
(74) *Attorney, Agent, or Firm* — James E. Piotrowski; Steven C. Bauman

(57) ABSTRACT

The present invention is related to an one component self-crosslinking reactive siloxane-terminated polypropylene oxide emulsion and a process for preparing the same. In the inventive process, using a reactive siloxane-terminated polypropylene oxide (SPPO) as raw material and a polyether-modified polysiloxane as protection colloid, a waterborne SPPO emulsion with excellent storage stability and freeze-thaw stability was prepared through phase inversion emulsification in the presence of composite emulsifying agent. And this process has some advantages such as low capital investment for equipment, simple procedure, easy operation and low production cost. And the obtained SPPO emulsion can be used as basic raw materials for the production of environmental friendly waterborne products such as paints, binders, sealing agents etc.

22 Claims, No Drawings

ONE-COMPONENT SELF-CROSSLINKING REACTIVE SILOXANE-TERMINATED POLYPROPYLENE OXIDE EMULSION AND PROCESS FOR PREPARING THE SAME

BACKGROUND OF THE INVENTION

1. Field of the Invention

The present invention is related to the fields of polymer and fine chemical engineering, more particularly, the present invention is related to an one component self-crosslinking reactive siloxane-terminated polypropylene oxide emulsion and a process for preparing the same.

2. Brief Description of Related Technology

As the base polymer for sealing materials, in recent years the reactive siloxane-terminated polypropylene oxide (SPPO) was developed quickly. All the companies from Germany such as Henkel and Degussa as well as the companies from USA such as Witco and Crompton etc develop sealing gums using SPPO as the base polymer, and the application of SPPO has been broadened from the earliest architectural field to others such as automotive field etc. However, nationwidely, the development with regard to SPPO is relatively slow, there are less reports about R&D and the relative patents can hardly be found.

As an important base polymer, waterborne SPPO not only will reduce the environmental pollution, but also can reduce the cost and simplify the production procedure with addition of various coagents, thus its application can be broadened from present architectural and automotive fields to domestic fields such as home furnishing and decoration etc.

However, SPPO molecular is with extremely strong hydrophobicity and comprises reactive terminal silanyloxy groups, which are extremely hydrosensitive and hydrolytic crosslinkable, thus hardly being waterborne, and presently no reports about waterborne SPPO can be found.

Thus, the preparation of waterborne SPPO emulsion with excellent properties can broaden the applications of SPPO greatly and is very important in practices and business.

Direct emulsification and phase inversion emulsification can emulsify polymers into waterborne emulsions without changing the molecular structures. Of which the direct emulsification generally needs a lot of surfactants and has to be stirred strongly for a long time, and only some polymers with special properties can be emulsified directly, so the application is limited. In contrary to the direct emulsification, the phase inversion emulsification can emulsify many polymers into waterborne emulsion directly without strong stirring, and the obtained emulsion is with small latex particle size and excellent stability.

SUMMARY OF THE INVENTION

The present invention is related to an one component self-crosslinking reactive siloxane-terminated polypropylene oxide emulsion and a process for preparing the same. The one component self-crosslinking reactive siloxane-terminated polypropylene oxide emulsion meets environmental requirements and has some advantages such as low cost, non-flammability and safety for use etc, thus can be used as basic materials in the production of environmental friendly polymeric products such as coatings, binders and sealing agents. The preparation process uses phase inversion emulsification to eliminate the need of lots of surfactants as well as strong stirring for long time, thus the production procedure is simple.

Specifically, the present invention provides an one component self-crosslinking reactive siloxane-terminated polypropylene oxide emulsion, which comprising a reactive siloxane-terminated polypropylene oxide and a composite emulsifying agent as well as optionally a lipophilic cosolvent and a protection colloid dissolved in water, wherein the reactive siloxane-terminated polypropylene oxide having a weight average molecular weight of from 1500 to 150000, preferably from 2000 to 100000, most preferably from 3000 to 80000, and having the following schematic formula:

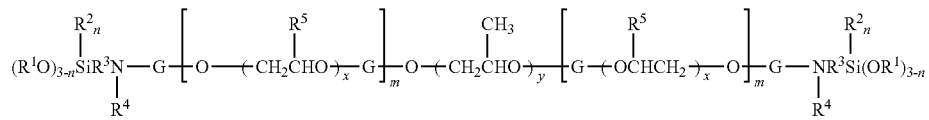

wherein, n is 0 or 1, m is an integer from 0 to 10, x is an integer from 1 to 50, y is an integer from 15 to 2000, $R^1$ is methyl or ethyl, $R^2$ is methyl or ethyl, $R^3$ is methylene or $-(CH_2)_3-$, $R^4$ is H or phenyl, $R^5$ is methyl or/and H, G is

in which $R^6$ is $-(CH_2)_6-$,

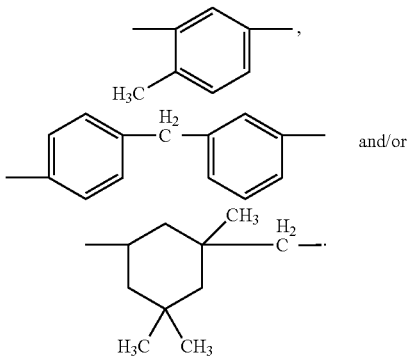

In present invention, the reactive siloxane-terminated polypropylene oxide may be prepared according to general processes as described e.g. in U.S. Pat. Nos. 5,300,608; 3,971,751; 4,374,237; 6,803,412; 5,986,014 and 6,420,492.

The inventive one component self-crosslinking reactive siloxane-terminated polypropylene oxide emulsion has a solid content of up to 80 wt %, preferably of 45-70 wt %.

The inventive one component self-crosslinking reactive siloxane-terminated polypropylene oxide emulsion has a latex particle size of less than 10 μm, preferably of 2-8 μm.

Thus, The inventive one component self-crosslinking reactive siloxane-terminated polypropylene oxide emulsion has high solid content and small latex particle size, thus resulting in excellent storage stability and freeze-thaw stability, and with regard to the storage stability, this emulsion can be stored stably at ambient temperature over 150 days, and can be stored stably at 50□ over 50 days.

The present invention further provides a process for preparing the one component self-crosslinking reactive siloxane-terminated polypropylene oxide emulsion through phase inversion emulsification, comprising the following steps:

a. adding the reactive siloxane-terminated polypropylene oxide and a composite emulsifying agent, optionally a lipophilic cosolvent and a protecting colloid, into a reactor, and mixing the same with sufficient stirring;

b. adding water into the mixture dropwise and further mixing with stirring; and c. after adding dropwise, further stirring for a time to obtain the one component self-crosslinking reactive siloxane-terminated polypropylene oxide emulsion.

More specifically, the inventive one component self-crosslinking reactive siloxane-terminated polypropylene oxide emulsion is prepared through phase inversion emulsification, comprising the following steps:

Adding SPPO and a composite emulsifying agent, optionally a lipophilic cosolvent and a protecting colloid, into a reactor at a temperature of 0-90°, preferably 5-50°, most preferably 10-40°, mixing the same with sufficient stirring for a time of from 10 to 240 minutes, preferably from 30 to 120 minutes, most preferably from 30 to 100 minutes;

Adding water into the mixture dropwise and uniformly, the stirring rate is controlled at 50-3000 rpm, preferably 100-2000 rpm, most preferably 200-1500 rpm; and After adding dropwise, further stirring for a time of from 10 to 240 minutes, preferably from 20 to 180 minutes, most preferably from 30 to 120 minutes, to obtain the SPPO emulsion finally.

According to the inventive process for preparing the one component self-crosslinking reactive siloxane-terminated polypropylene oxide emulsion, wherein based on 100 parts of the reactive siloxane-terminated polypropylene oxide, the composite emulsifying agent is in an amount of from 2 to 20 parts, preferably from 4 to 16 parts, most preferably from 4 to 14 parts, the lipophilic cosolvent is in an amount of from 0 to 30 parts, preferably from 0 to 25 parts, most preferably from 0 to 20 parts, the protecting colloid is in an amount of from 0 to 10 parts, preferably from 0 to 8 parts, most preferably from 0 to 6 parts, and the water is in an amount of from 20 to 200 parts, preferably from 30 to 150 parts, most preferably from 40 to 120 parts, all the parts are weight parts.

More specifically, according to present invention, the raw materials used for preparing the one component self-crosslinking reactive siloxane-terminated polypropylene oxide emulsion comprise a reactive siloxane-terminated polypropylene oxide (SPPO), a composite emulsifying agent, a lipophilic cosolvent, a protecting colloid and water, i.e. 5 components, wherein the lipophilic cosolvent and the protecting colloid are optional.

According to present invention, the SPPO has a weight average molecular weight of from 1000 to 100000, preferably from 1500 to 90000, most preferably from 2000 to 80000, this SPPO comprises reactive terminal silanyloxy on which the number of alkoxy is 2 or 3, and the alkoxy preferably is methoxy and ethoxy.

According to present invention, the composite emulsifying agent is a composition of nonionic surfactant and anionic surfactant or a composition of nonionic surfactant and cationic surfactant, and in the compositions, the weight ratio between the nonionic surfactant and the anionic surfactant as well as the weight ratio between the nonionic surfactant and the cationic surfactant are from 0.5 to 10, preferably from 1 to 7.5, most preferably from 1 to 5.

Specifically, the nonionic surfactant is selected from the group consisting of the following: fatty glyceride, such as fatty acid monoglyceride etc; sorbitan fatty acid ester, such as sorbitol monopalminate (Span-40) etc; polysorbate, such as polyoxyethylene (20) sorbitan monopalminate (Tween-40) etc; polyoxyethylene aliphatate, such as polyoxyethylene (40) stearate etc; and polyoxyethylene ether, such as polyoxyethylene nonyl phenol ether (OP-10), polyoxyethylene nonyl phenol ether (OP-3) etc.

Specifically, the aminonic surfactant is selected from the group consisting of the following: alkyl sulphate, such as sodium dodecyl sulphate (SDS) etc; alkylbenzene sulphonate, such as sodium dodecyl benzene sulphonate (SOBS) etc; and alkyl diphenyl ether disulphonate, such as sodium dodecyl diphenyl ether disulphonate (SDD) etc.

Specifically, the cationic surfactant is quaternary ammonium type surfactant, e.g. dodecyl trimethyl ammonium chloride, aliphatic amido dimethyl dihydroxyl dipropyl quaternary ammonium phosphotriester trichloride etc.

According to present invention, the lipophilic cosolvent is alkane, cycloalkane, aromatic hydrocarbon or ether as well as derivatives thereof, e.g. n-hexane, cyclohexane or toluene etc.

According to present invention, the protecting colloid is a polyether-modified polysiloxane, specifically, a comb-form polysiloxane comprising pendant polyether chain which preferably is polyethylene oxide as well as copolymer of ethylene oxide and propylene oxide, having the following schematic formula:

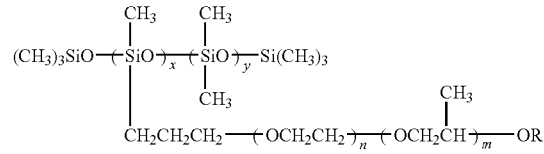

wherein, x is an integer from 10 to 10000, y is an integer from 0 to 10000, n is an integer from 5 to 2000, m is an integer from 0 to 2000, and R is H, $CH_3$, $C_2H_5$ or $OCCH_3$.

In present invention, the protecting colloid is prepared according to the process described in literature (Cai Zhenyun etc, *organosilicon materials*, 2005, 19(4):20-22)).

DETAILED DESCRIPTION OF THE INVENTION

The present invention is further illustrated detailedly by the following examples, which are provided for illustrative purpose only rather than limiting the invention thereto.

In all the following examples, the SPPO is provided by Henkel Company (Duesseldorf, Germany), e.g. see U.S. Pat. No. 5,300,608, the specific parameters thereof are shown in table 1:

TABLE 1

The specific parameters of SPPO in present invention

| SPPO | Reactive terminal group | Molecular weight ($M_w$, g/mol) | Viscosity (mPa · s) |
|---|---|---|---|
| STPEMO2-35 | —$Si(OCH_3)_2CH_3$ | 8000 | 3500 |
| STPEMO2-120 | —$Si(OCH_3)_2CH_3$ | 20000 | 12000 |
| BAC-LA-8872-85 | —$Si(OCH_3)_3$ | 8500 | 4320 |

In all the following examples, the solid content of the emulsion is measured by weight method; the latex particle size is measured at 25° using Zetasize-3000HS Laser Particle Sizer from Malvern Company British; the freeze-thaw stability of the emulsion is measured according to the national standard of People's Republic of China GB9268-88; and the storage stability of the emulsion at ambient temperature and at 50° is measured in climatic chamber by static method.

All the parts in the following examples are weight parts.

Example 1

Adding 100 parts STPEMO2-35, 9.6 parts OP-10, 2.4 parts SDD, 2 parts protecting colloid (in the schematic formula: x=500, y=100, m=0, n=300, and R is H) and 15 parts toluene into a cylindric flat-bottom vessel at 20°, mixing the same with sufficient stirring for a time of 15 minutes. Then adding 80 parts deionized water into the mixture dropwise and uniformly, the stirring rate is controlled at about 200 rpm. After adding dropwise, further stirring for a time of 30 minutes to obtain the SPPO emulsion. The properties of the obtained emulsion are shown in table 2.

Example 2

Adding 100 parts STPEMO2-35, 6 parts OP-10, 4 parts Tween-40, 3 parts protecting colloid (in the schematic formula: x=500, y=200, m=0, n=300, and R is $CH_3$) and 20 parts cyclohexane into a cylindric flat-bottom vessel at 30°, mixing the same with sufficient stirring for a time of 15 minutes. Then adding 100 parts deionized water into the mixture dropwise and uniformly, the stirring rate is controlled at about 300 rpm. After adding dropwise, further stirring for a time of 30 minutes to obtain the SPPO emulsion. The properties of the obtained emulsion are shown in table 2.

Example 3

Adding 100 parts STPEMO2-120, 9.6 parts OP-10, 2.4 parts dodecyl trimethyl ammonium chloride and 15 parts toluene into a cylindric flat-bottom vessel at 20°, mixing the same with sufficient stirring for a time of 20 minutes. Then adding 100 parts deionized water into the mixture dropwise and uniformly, the stirring rate is controlled at about 500 rpm. After adding dropwise, further stirring for a time of 45 minutes to obtain the SPPO emulsion. The properties of the obtained emulsion are shown in table 2.

Example 4

Adding 100 parts BAC-LA-8872-85, 10 parts OP-3, 6 parts SDD, 4 parts protecting colloid (in the schematic formula: x=600, y=0, m=50, n=300, and R is $C_2H_5$) and 15 parts toluene into a cylindric flat-bottom vessel at 30°, mixing the same with sufficient stirring for a time of 30 minutes. Then adding 120 parts deionized water into the mixture dropwise and uniformly, the stirring rate is controlled at about 1000 rpm. After adding dropwise, further stirring for a time of 60 minutes to obtain the SPPO emulsion. The properties of the obtained emulsion are shown in table 2.

Example 5

Adding 100 parts STPEMO2-120, 8 parts Tween-40, 4 parts SDBS, 6 parts protecting colloid (in the schematic formula: x=400, y=100, m=10, n=150, and R is $OCCH_3$) and 25 parts cyclohexane into a cylindric flat-bottom vessel at 40°, mixing the same with sufficient stirring for a time of 20 minutes. Then adding 100 parts deionized water into the mixture dropwise and uniformly, the stirring rate is controlled at about 500 rpm. After adding dropwise, further stirring for a time of 30 minutes to obtain the SPPO emulsion. The properties of the obtained emulsion are shown in table 2.

most preferably from 30 to 100 minutes;

Example 6

Adding 100 parts STPEMO2-30, 10 parts OP-10, 2 parts SDS, 2 parts protecting colloid (in the schematic formula: x=200, y=0, m=30, n=150, and R is $OCCH_3$) and 10 parts toluene into a cylindric flat-bottom vessel at 20°, mixing the same with sufficient stirring for a time of 15 minutes. Then adding 60 parts deionized water into the mixture dropwise and uniformly, the stirring rate is controlled at about 400 rpm. After adding dropwise, further stirring for a time of 30 minutes to obtain the SPPO emulsion. The properties of the obtained emulsion are shown in table 2.

Example 7

Adding 100 parts STPEMO2-30, 8 parts OP-3, 6 parts SDBS and 15 parts toluene into a cylindric flat-bottom vessel at 30°, mixing the same with sufficient stirring for a time of 15 minutes. Then adding 80 parts deionized water into the mixture dropwise and uniformly, the stirring rate is controlled at about 300 rpm. After adding dropwise, further stirring for a time of 30 minutes to obtain the SPPO emulsion. The properties of the obtained emulsion are shown in table 2.

Example 8

Adding 100 parts STPEMO2-120, 8 parts OP-10, 4 parts dodecyl trimethyl ammonium chloride and 15 parts toluene into a cylindric flat-bottom vessel at 20□, mixing the same with sufficient stirring for a time of 15 minutes. Then adding 100 parts deionized water into the mixture dropwise and uniformly, the stirring rate is controlled at about 600 rpm. After adding dropwise, further stirring for a time of 60 minutes to obtain the SPPO emulsion. The properties of the obtained emulsion are shown in table 2.

Example 9

Adding 100 parts STPEMO2-30, 10 parts Tween-40, 4 parts SDS, 2 parts protecting colloid (in the schematic formula: x=300, y=50, m=10, n=150, and R is $CH_3$) and 15 parts cyclohexane into a cylindric flat-bottom vessel at 20°, mixing the same with sufficient stirring for a time of 15 minutes. Then adding 100 parts deionized water into the mixture dropwise and uniformly, the stirring rate is controlled at about 500 rpm. After adding dropwise, further stirring for a time of 30 minutes to obtain the SPPO emulsion. The properties of the obtained emulsion are shown in table 2.

TABLE 2

The properties of the SPPO emulsion prepared in each example

| Ex. | Latex particle size/μm | Solid content/% | Storage stability/day 50° | Storage stability/day Ambient temperature | Freeze-thaw stability 6 hours | Freeze-thaw stability 48 hours |
|---|---|---|---|---|---|---|
| 1 | 4.43 | 52.23 | >50 | >150 | stable | stable |
| 2 | 2.55 | 47.25 | >50 | >150 | stable | stable |
| 3 | 7.15 | 48.45 | >50 | >150 | stable | stable |
| 4 | 6.65 | 46.12 | >50 | >150 | stable | stable |
| 5 | 5.87 | 46.28 | >50 | >150 | stable | stable |
| 6 | 2.33 | 60.54 | >50 | >150 | stable | stable |
| 7 | 3.12 | 53.11 | >50 | >150 | stable | stable |

TABLE 2-continued

The properties of the SPPO emulsion prepared in each example

| Ex. | Latex particle size/μm | Solid content/% | Storage stability/day 50° | Ambient temperature | Freeze-thaw stability 6 hours | 48 hours |
|---|---|---|---|---|---|---|
| 8 | 4.03 | 47.68 | >50 | >150 | stable | stable |
| 9 | 3.55 | 46.11 | >50 | >150 | stable | stable |

As can be seen from the data in table 2, the reactive siloxane-terminated polypropylene oxide emulsion according to present invention is with high solid content, small latex particle size as well as excellent storage stability and freeze-thaw stability

The invention claimed is:

1. An one component self-crosslinking reactive siloxane-terminated polypropylene oxide emulsion, which comprises a reactive siloxane-terminated polypropylene oxide; a composite emulsifying agent; and optionally a lipophilic cosolvent and a protecting colloid dissolved in water, wherein the reactive siloxane-terminated polypropylene oxide has a weight average molecular weight of from 1500 to 150000, and the following schematic formula:

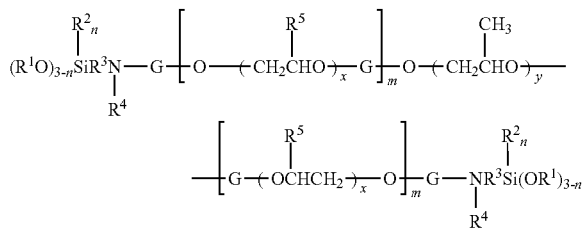

wherein, n is 0 or 1, m is an integer from 0 to 10, x is an integer from 1 to 50, y is an integer from 15 to 2000, $R^1$ is methyl or ethyl, $R^2$ is methyl or ethyl, $R^3$ is methylene or —$(CH_2)_3$—, $R^4$ is H or phenyl, $R^5$ is methyl or H, G is

in which $R^6$ is —$(CH_2)_6$—,

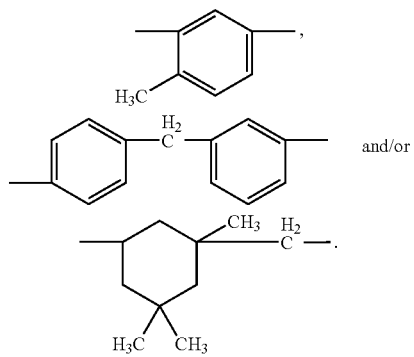

2. The one component self-crosslinking reactive siloxane-terminated polypropylene oxide emulsion according to claim 1, which is characterized in that the solid content of the emulsion is up to 80 wt %.

3. The one component self-crosslinking reactive siloxane-terminated polypropylene oxide emulsion according to claim 1, which is characterized in that the solid content of the emulsion is 45-70 wt %.

4. The one component self-crosslinking reactive siloxane-terminated polypropylene oxide emulsion according to claim 1, having a latex particle size of the emulsion of less than 10 μm.

5. The one component self-crosslinking reactive siloxane-terminated polypropylene oxide emulsion according to claim 1, having a particle size of the emulsion of 2-8 μm.

6. The one component self-crosslinking reactive siloxane-terminated polypropylene oxide emulsion according to claim 1, wherein based on 100 parts of the reactive siloxane-terminated polypropylene oxide, the composite emulsifying agent is in an amount of from 2 to 20 parts, the lipophilic cosolvent is in an amount of from 0 to 30 parts, the protecting colloid is in an amount of from 0 to 10 parts, and the water is in an amount of from 20 to 200 parts, all the parts are weight parts.

7. The one component self-crosslinking reactive siloxane-terminated polypropylene oxide emulsion according to claim 1, wherein the composite emulsifying agent is a composition of nonionic surfactant and anionic surfactant or a composition of nonionic surfactant and cationic surfactant.

8. The one component self-crosslinking reactive siloxane-terminated polypropylene oxide emulsion according to claim 7, wherein with regard to the composite emulsifying agent the weight ratio between the nonionic surfactant and the anionic surfactant as well as the weight ratio between the nonionic surfactant and the cationic surfactant are of from 0.5 to 10.

9. The one component self-crosslinking reactive siloxane-terminated polypropylene oxide emulsion according to claim 7, wherein the nonionic surfactant is selected from the group consisting of fatty glyceride, sorbitan fatty acid ester, polysorbate, polyoxyethylene aliphatate and polyoxyethylene ether, the anionic surfactant is selected from the group consisting of alkyl sulphate, alkylbenzene sulphonate and alkyl biphenyl ether disulphonate, and the cationic surfactant is quaternary ammonium surfactant selected from the group consisting of dodecyl trimethyl ammonium chloride and aliphatic amido dimethyl dihydroxyl dipropyl quaternary ammonium phosphotriester trichloride.

10. The one component self-crosslinking reactive siloxane-terminated polypropylene oxide emulsion according to claim 1, wherein the lipophilic cosolvent is selected from the group consisting of alkane, cycloalkane, and aromatic hydrocarbon.

11. The one component self-crosslinking reactive siloxane-terminated polypropylene oxide emulsion according to claim 1, wherein the protecting colloid is a polyether-modified polysiloxane having the following schematic formula:

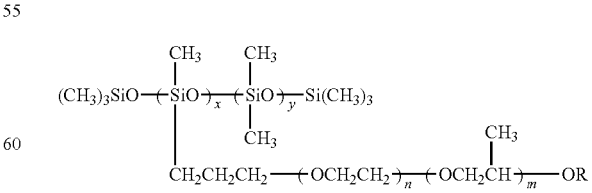

wherein, x is an integer from 10 to 10000, y is an integer from 0 to 10000, n is an integer from 5 to 2000, m is an integer from 0 to 2000, and R is H, $CH_3$, $C_2H_5$ or $OCCH_3$.

12. A process for preparing an one component self-crosslinking reactive siloxane-terminated polypropylene oxide emulsion through phase inversion emulsification, wherein the reactive siloxane-terminated polypropylene oxide having a weight average molecular weight of from 1500 to 150000, and has the following schematic formula:

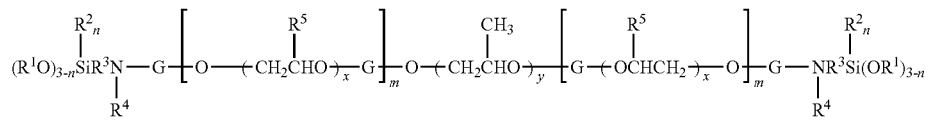

wherein, n is 0 or 1, m is an integer from 0 to 10, x is an integer from 1 to 50, y is an integer from 15 to 2000, $R^1$ is methyl or ethyl, $R^2$ is methyl or ethyl, $R^3$ is methylene or —$(CH_2)_3$—, $R^4$ is H or phenyl, $R^5$ is methyl or H, G is

in which $R^6$ is —$(CH_2)_6$—,

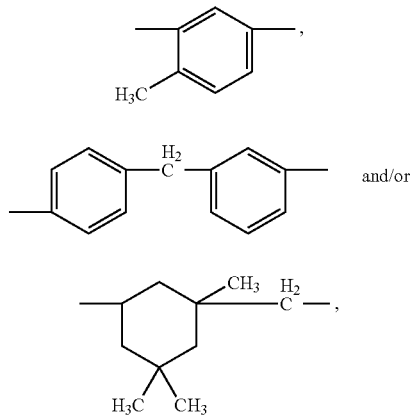

comprising the following steps:
a. adding the reactive siloxane-terminated polypropylene oxide and a composite emulsifying agent, optionally a lipophilic cosolvent and a protecting colloid, into a reactor, and mixing the same with stirring;
b. adding water into the mixture and further mixing with stirring; and
c. after adding water, further stirring for a time to obtain the one component self-crosslinking reactive siloxane-terminated polypropylene oxide emulsion.

13. The process according to claim 12, wherein based on 100 parts of the reactive siloxane-terminated polypropylene oxide, the composite emulsifying agent is in an amount of from 2 to 20 parts, the lipophilic cosolvent is in an amount of from 0 to 30 parts, the protecting colloid is in an amount of from 0 to 10 parts, and the water is in an amount of from 20 to 200 parts, all the parts are weight parts.

14. The process according to claim 12, wherein in step a the temperature is 0-90° C. and the stirring is continued for a time of from 10 to 240 minutes, in step b the stirring rate is controlled at 50-3000 rpm, and in step c the stirring is continued for a time of from 10 to 240 minutes.

15. The process according to claim 12, wherein in step a the temperature is of 5-50° C. and the stirring is continued for a time of from 30 to 120 minutes, in step b the stirring rate is controlled at 100-2000 rpm, and in step c the stirring is continued for a time of from 20 to 180 minutes.

16. The process according to claim 12, wherein in step a the temperature is of 10-40° C. and the stirring is continued for a time of from 30 to 100 minutes, in step b the stirring rate is controlled at 200-1500 rpm, and in step c the stirring is continued for a time of from 30 to 120 minutes.

17. The process according to claim 12, wherein the composite emulsifying agent is a composition of nonionic surfactant and anionic surfactant or a composition of nonionic surfactant and cationic surfactant.

18. The process according to claim 17, wherein with regard to the composite emulsifying agent the weight ratio between the nonionic surfactant and the anionic surfactant as well as the weight ratio between the nonionic surfactant and the cationic surfactant are from 0.5 to 10.

19. The process according to claim 17, wherein the nonionic surfactant is selected from the group consisting of fatty glyceride, sorbitan fatty acid ester, polysorbate, polyoxyethylene aliphatate and polyoxyethylene ether, the anionic surfactant is selected from the group consisting of alkyl sulphate, alkylbenzene sulphonate and alkyl biphenyl ether disulphonate, and the cationic surfactant is quaternary ammonium type selected from the group consisting of dodecyl trimethyl ammonium chloride and aliphatic amido dimethyl dihydroxyl dipropyl quaternary ammonium phosphotriester trichloride.

20. The process according to claim 12, wherein the lipophilic cosolvent is selected from the group consisting of alkane, cycloalkane, and aromatic hydrocarbon.

21. The process according to claim 12, wherein the protecting colloid is a polyether-modified polysiloxane having the following schematic formula:

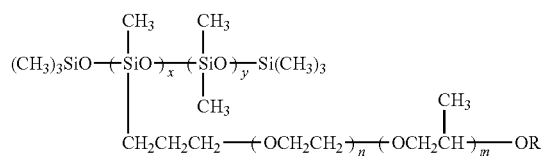

wherein, x is an integer from 10 to 10000, y is an integer from 0 to 10000, n is an integer from 5 to 2000, m is an integer from 0 to 2000, and R is H, $CH_3$, $C_2H_5$ or $OCCH_3$.

22. The process according to claim 12, wherein in step b the water is added dropwise and uniformly.

* * * * *